United States Patent [19]

Dilling et al.

[11] 4,454,066
[45] Jun. 12, 1984

[54] REDUCTION OF LIGNIN COLOR

[75] Inventors: Peter Dilling, Isle of Palms; Peter T. Sarjeant, Sullivans Island, both of S.C.

[73] Assignee: Westvaco Corporation, New York, N.Y.

[21] Appl. No.: 438,391

[22] Filed: Nov. 1, 1982

[51] Int. Cl.$^3$ .................................................. C07G 1/00
[52] U.S. Cl. .................................................. 260/124 R
[58] Field of Search .......................................... 260/124

[56] References Cited

U.S. PATENT DOCUMENTS

| | | | |
|---|---|---|---|
| 2,525,433 | 10/1950 | Voet | 106/30 |
| 2,680,113 | 6/1954 | Adler et al. | 260/124 |
| 2,690,973 | 10/1954 | Voet | 106/20 |
| 3,441,528 | 4/1969 | Dede, Jr. | 260/17.2 |
| 3,503,762 | 3/1970 | Remer | 106/23 |
| 3,672,817 | 6/1972 | Falkehag et al. | 8/79 |
| 3,763,139 | 10/1973 | Falkehag et al. | 260/124 R |
| 3,769,272 | 10/1973 | Hintz | 260/124 R |
| 3,865,803 | 2/1975 | Falkehag | 260/124 A |

OTHER PUBLICATIONS

K. V. Sarkanen, et al., "Lignins" (1971) p. 457.

*Primary Examiner*—Delbert R. Phillips
*Attorney, Agent, or Firm*—Terry B. McDaniel; Richard L. Schmalz

[57] ABSTRACT

Sulfonated lignin and lignosulfonate color reductions of over 90 percent, and in some cases as high as 95 percent, are achieved by a two-step process involving the blocking of phenolic groups on the lignin molecule with known blocking agents followed by oxidation with chlorine dioxide. The light colored lignin dispersants produced by the invention process exhibit very low staining and low azo dye reduction, good heat stability, dye grinding efficiency, and dispersion stability.

6 Claims, No Drawings

REDUCTION OF LIGNIN COLOR

BACKGROUND OF THE INVENTION (1) Field of the Invention

This invention relates to improved sulfonated lignin surfactants and their use as dispersants in dyestuffs. More particularly, this invention relates to lignin surfactants having reduced staining characteristics produced by a two-step process involving blocking the phenolic functions followed by oxidative reactions.

(2) Description of the Prior Art

Sulfonated lignins and lignosulfonates from kraft and sulfite pulping processes have long been recognized for their excellent dye dispersant properties, but their dark color has excluded them from use with many fabrics since this may produce slight staining or darkening of sensitive shades on textiles. When sulfonated lignin or lignosulfonate is used as a dye dispersant, it is ball-milled with a dye cake and the mixture is then used for dyeing natural or synthetic fibers. During the dyeing process, some of the lignin can absorb onto the fabric fibers distorting the true color of the dye. The magnitude of the problem depends on the color of the lignin material.

Lignin in its natural state is almost colorless. The cause of the brown color of industrial lignins and lignosulfonates and the mechanism for the formation of chromophores during the pulping process are not completely known, although numerous suggestions have been made over the years. Based on the results of three approaches, in *Advanced Chemical Series*, Vol. 59, 75 (1966), Falkehag et al. proposed the following chromophores to be the potential color causing structures in kraft lignin: (1) CH=CH double bonds conjugated with the aromatic ring (as in stilbenes), (2) quinone methides and quinones, (3) chalcone structures, (4) free radicals, and (5) metal complexes with catechol structures. In *Tappi*, Vol. 54 (No. 10) 1680–4 (1971), Imsgard et al. estimated that although spruce milled wood lignin contains only about 0.7% o-quinoid structures, these structures can account for as much as 35–60% of the ultraviolet light absorption of lignin at 457 nm. In any event, INDULIN AT, a kraft wood lignin, has an absorptivity at 457 nm of 0.91 $(g^{-1})(1)(cm^{-1})$. This is more than 15 times the value for spruce milled wood lignin, 0.06 $(g^{-1})(1)(cm^{-1})$.

The occurrence of quinoid structures in the kraft pulping process is widely acknowledged to be caused by a nucleophilic attack on guaiacol (softwood) or syringyl (hardwood) structures by $OH^-$ and $SH^-$ ion species. Demethylation reactions resulting in catecholic compounds easily undergo auto-oxidation to yield colored o-quinoid structures. The latter may give a variety of secondary reactions such as cycloaddition and polymerization yielding further chromophoric systems, as taught by Musso and Dopp in *Chemische Berichte*, 100:3627 (1967).

COLORLESS

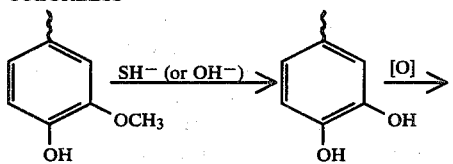

COLORED

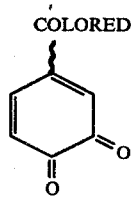

It has been shown that the color of lignin may be reduced to some degree by blocking the free-phenolic hydroxyls in lignin. Several blocking methods have been set forth, such as in U.S. Pat. No. 3,672,817 where the lignin color was reduced as much as 44% by blocking the phenolic hydroxyl with an alkylene oxide or a halogen-containing alkyl alcohol. In U.S. Pat. No. 3,763,139, lignin color was reduced by blocking the phenolic hydroxyl with reagents, such as chloromethane sulfonate, chloromethane phosphonate, 2-chloroethanol and the like. In U.S. Pat. No. 3,769,272, lignin color was reduced by blocking with 3-chloro-2-hydroxypropane-1-sulfonate. And in U.S. Pat. No. 3,865,803, the phenolic hydroxyl was blocked with an agent of the type $X(CH_2)_nY$, where X is a halogen, activated double bond, epoxide ring, or a halohydrin, Y is a sulfonate, phosphonate, hydroxyl, sulfide, or a secondary or tertiary amine, and (n) is an integer from 1 to 5.

Although each of the above methods gave some reduction of the color of an alkali lignin or lignosulfonate, none reduced the color to a sufficiently desirable extent.

SUMMARY OF THE INVENTION

It has been found that sulfonated lignin and lignosulfonate color reductions of over 90 percent, and in some cases as high as 95 percent, are achieved by a two-step process involving the blocking of phenolic groups on the lignin molecule with known blocking agents followed by oxidation with chlorine dioxide. The light colored lignin dispersants produced by the invention process exhibit very low staining and low azo dye reduction, good heat stability, dye grinding efficiency, and dispersion stability.

DESCRIPTION OF THE PREFERRED EMBODIMENT

Lignin is a polymeric substance of substituted aromatics found in plant and vegetable tissues associated with cellulose and other plant constituents. In the pulp and paper industry, lignin-containing materials such as wood, straw, corn stalks, bagasse and other vegetable and plant tissues are processed to recover the cellulose fibers or pulp. The residual pulping liquors containing the lignin as a by-product is thus one of the major sources of lignin. The lignin recovered from the sulfite process is water-soluble lignosulfonate. The lignin recovered from the kraft or soda process is not sulfonated and insoluble in water. However, kraft lignin has been subsequently sulfonated by various methods to produce useful dispersants. One method of sulfonating kraft lignin is taught by Adler et al. in U.S. Pat. No. 2,680,113. For the purpose of this invention, sulfonated kraft lignin is called sulfonated lignin to distinguish it from lignosulfonate of sulfite pulping liquors. The lignins employed to make the products of this invention include both sulfonated lignins and lignosulfonates.

The invention lignin color reduction process consists of two essential chemical processing steps: (1) etherification (blocking) of phenolic groups on the lignosulfonate, and (2) bleaching of the blocked lignin using chlorine dioxide (ClO$_2$) as the oxidative reagent.

Etherification

In the first step, any blocking reagent which is reactive enough to block at least 80% of the phenolic functions in the lignosulfonate or sulfonated lignin could be used. Preferably, 90% of the phenolic functions are blocked. However, nonionic type reactants such as ethylene oxide reduce the electron resonance of the lignin molecule and were found superior in reducing the electrolyte content when compared to reactants which contain an ionizable end group.

Another blocking agent is diethylsulfate, or homologues or analogues of it. However, diethylsulfate produces an electrolyte, which may be disadvantageous.

Propylene oxide, as the electrolyte producing compound, however, generates NaOH which is beneficial for the subsequent bleaching step which requires an alkaline pH media anyway. A portion of the sodium is used for the ionization of carboxyl groups which appear during the course of oxidation.

Blocking, to the extent of at least 80% of the available phenols, is necessary to obtain color stable lignin dispersants, as shown by testing at high pH, temperature and pressure. Below this level, color reversion may occur which results in fiber staining and azo dye reduction. Lignin degradation reactions resulting in deterioration of heat stability are also associated with bleaching of partially blocked lignin derivatives under the process conditions. Color stability is best when at least 90% of the available phenols are blocked.

Propylene oxide alone may not provide the preferred blocking level on a consistent basis unless large and unrealistic amounts of alkoxide are applied. Therefore, a post treatment of relatively small quantities (0.5 mole per mole of lignin, arbitrarily set at 1000) of a powerful reagent, such as diethylsulfate, may be employed to increase the blocking from a usual 85-87% level to over 90%. Five (5) moles per 1000 grams lignin of propylene oxide are optimally used prior to the diethylsulfate addition.

Reaction temperature profiles indicate that the propylene oxide reaction with lignin proceeds equally well at temperatures between 25° C. and 100° C. while diethylsulfate reactions at around 25° C. are preferred.

The use of certain blocking agents, such as 3-chloro-2-hydroxypropane-1 sulfonate, permits introduction of solubilizing groups, i.e., sulfonating during the blocking step. Therefore, with such blocking agents, either sulfonated or non-sulfonated lignins can be employed. The preferred non-sulfonated lignin is kraft lignin.

Bleaching

Chlorine dioxide is the most efficient oxidation reagent in reducing the color of sulfonated lignins and lignosulfonates under the process conditions. In addition, the color obtained was stable to pH, pressure and temperature, providing that at least 80% of the phenolic hydroxyl groups were etherified prior to the chlorine dioxide application and that the oxidation was carried out at ambient temperatures at a pH of 5-13, preferably between 8 and 11.

The chlorine dioxide bleaching may be accomplished in either a batch or continuous system. Typically, in either type small scale process the chlorine dioxide is generated by passing a 10% chlorine in 90% nitrogen gas up through one or more columns packed with dry granular sodium chlorite. Chlorine dioxide is formed by the following reaction:

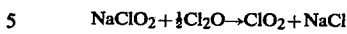

In the batch process, the chlorine dioxide gas then enters a lignin containing column at the bottom of the column via a fritted disk, travelling upward and interacting with the 25% solids lignin solution. In a continuous process, the lignin containing column is a packed contacting column and the lignin solution enters the column at the top and travels downward while the chlorine dioxide gas enters the column at the bottom and travels upward. The decolorized lignin product flows out the bottom of the column.

The amount of chlorine dioxide reacted with the lignin may be determined by a two-step process. First, a blank experiment provides information regarding the quantity of chlorine dioxide generated over a given time period using a standarized flow rate of chlorine gas. The amounts collected in several wash bottles are determined by known titration methods. In the second step, the lignin is bleached under the identical conditions used in the blank run. The total quantity of chlorine dioxide generated during the time needed for proper lignin bleaching is thus measured. This figure should correspond to from 0.1 to 5 moles per 1000 grams of lignin, preferably 1 to 2 moles, and most preferably 1.4 moles.

During the bleaching step, the pH is reduced. Periodic pH readjustments to pH 8-11 may be found to be necessary for optimum color stability. Bleaching below this pH range indicates an additional color reversion at alkaline pH during the grinding and dyeing applications. The amounts of alkali required is dependent upon the extent at which phenolic hydroxyl groups have been blocked in the preceding step. At the preferred level of 90% blocking, about 1.3 moles of sodium hydroxide are generally required in addition to the caustic which already exists in the lignin solution. Below or above the 90% blocking degree, caustic requirements are correspondingly more or less, respectively. For instance, as much as 16 moles caustic is needed when unblocked lignosulfonates or sulfonated lignins are used during ambient temperature bleaching.

After bleaching, the light colored product can be removed and spray dried.

The invention is illustrated in the following examples.

EXAMPLE 1

One thousand grams of sulfonated lignin (REAX 83, made by Westvaco Corporation) was slurried to 30% solids in water and reacted with 5 moles (290.4 grams) propylene oxide at 80° C. by adding the propylene oxide over one hour. The reaction mixture was cooled to room temperature and 0.5 mole (77.09 grams) diethylsulfate was added and allowed to react for eight hours.

Three thousand grams of the aqueous solution of blocked sulfonated lignin was placed in a 4000 mL glass beaker equipped with an overhead stirrer. A type K thermocouple and pH probe were then placed in the beaker and agitation begun. The pH was adjusted to pH 10.0-10.5 by adding 50% aqueous solution hydroxide and recording the weight used. A tared separatory funnel was attached above the sulfonated lignin solution and filled with 50% aqueous sodium hydroxide. This was later adjusted to drop sodium hydroxide slowly into the batch, maintaining the pH at 10.0–10.5.

An ultraviolet adsorption (U.V.) technique was used for easy determination of the extent of free phenolic hydroxyl group blocking in the lignin materials. The technique involved determining a blocking value for a starting (non-blocked) material and a blocked (chemically treated) material made from the starting material. These values were calculated from two U.V. curves—an ionization difference curve and a standard curve. From these two curves three values were taken and plugged into the following equation:

$$\text{Blocking Value} = B.V. = \frac{Abs_i\ 300\ \text{nm} - Abs_i\ 280\ \text{nm}}{Abs\ 280\ \text{nm Standard}}$$

$Abs$ 280 nm standard = absorption at 280 nm on the regular U.V. curve (acid solution in the sample cell and distilled water in the reference cell).

$Abs_i$ 300 nm = absorption at 300 nm on the difference U.V. curve (base in sample, acid in reference).

$Abs_i$ 280 nm = absorption at 280 nm on the difference U.V. curve.

The percent blocking caused by chemical reaction was then calculated using the following equation:

% Blocking =

$$\frac{(B.V.\ \text{non-blocked sample}) - (B.V.\ \text{blocked sample})}{B.V.\ \text{non-blocked sample}} \times 100$$

After blocking, the chlorine dioxide generation was then begun. This was accomplished by passing a 93% $N_2$, 7% $Cl_2$ mixture (570 cc/min., 42 cc/min., respectively) up through a packed bed of sodium chlorite housed in a 10 cm (diameter)×91 cm (4″×3′) glass column.

When the chlorine dioxide production had reached its maximum rate, a valve was opened, and the chlorine dioxide/nitrogen mixture was introduced to the lignosulfonate solution via a fritted gas dispersion tube functioning as a dip tube feed. A strip chart recorder, monitoring both time and temperature, was started simultaneously with the introduction of chlorine dioxide.

Throughout the decolorization reaction, temperature was maintained at 25° C. plus or minus 1° C. and aqueous sodium hydroxide was added slowly to maintain a pH of 10.0–10.5.

When the sulfonated lignin solution began to show signs of losing its buffering capacity, i.e., addition of a small amount of sodium hydroxide causes a large pH increase, the reaction was nearing completion. At this point, a small sample was drawn into a disposable pipet and saved. Sodium hydroxide addition was discontinued and the pH allowed to drift down to approximately pH 7. Another sample was drawn and the color of the two samples compared. The pH 10 samples were darker indicating that the reaction was not complete so the pH was raised to pH 10 again and allowed to drift back down to ph 7 with the addition of chlorine dioxide. This cycle was continued until the color was constant at pH 7 and 10, indicating that the reaction was complete. The product was then removed and spray dried.

EXAMPLE 2

A series of sulfonated lignin blocking and oxidation reactions were conducted generally according to the procedure followed in Example 1 where either propylene oxide or diethylsulfate alone was used for blocking. For comparisons of bleaching efficiency, the oxidation was performed with various oxidants in addition to the claimed chlorine dioxide. The decolorized sulfonated lignins were then tested for heat stability, fiber staining and color and compared with the unmodified sulfonated lignin control. The results are shown in Table I.

TABLE I

Heat Stability, Fiber Staining and Color Using Various Methods to Block and Oxidize

| Modification Blocking/Oxidation (Moles/1000 grams Sulfonated Lignin) | Heat Stability With Dyestuff Red I (mg Filter Residue) | Staining Light Reflectance (%)* pH 4 | pH 7 | Residual Color** (%) | Physical Color | Remarks |
|---|---|---|---|---|---|---|
| 4 DES + $ClO_2$ | 5.4 | 95 | 98 | 7.1 | Yellow | |
| 4 PO + 5 NaOCl | 110.0 | 84 | 96 | 10.5 | Yellow-Light Brown | Color was unstable to heat, pH, pressure |
| 4 DES + 3 $H_2O_2$ | 93.0 | 80 | 93 | 45.0 | Brown | Some color instability at high temperatures (higher than 100° C.) |
| 4 PO + 2 $NaClO_2$ | 32.0 | 85 | 95 | 17.4 | Light Brown | Color was unstable to heat, pH, pressure |
| 4 DES + 2 $NaClO_4$ | 27.0 | 88 | 94 | 31.0 | Brown | Unreacted oxidant caused fire hazards upon drying |
| Control | 447.0 | 59 | 81 | 100.0 | Dark | |

TABLE I-continued
Heat Stability, Fiber Staining and Color
Using Various Methods to Block and Oxidize

| Modification Blocking/Oxidation (Moles/1000 grams Sulfonated Lignin) | Heat Stability With Dyestuff Red I (mg Filter Residue) | Staining Light Reflectance (%)* | | Residual Color** (%) | Physical Color | Remarks |
|---|---|---|---|---|---|---|
| | | pH 4 | pH 7 | | | |
| | | | | | Brown | |

PO = Propylene Oxide
DES = Diethylsulfate
H$_2$O$_2$ = Hydrogen Peroxide
NaClO$_2$ = Sodium Chlorite
NaOCl = Sodium Hypochlorite
NaClO$_4$ = Sodium Perchlorate
ClO$_2$ = Chlorine Dioxide
*100% Light Reflectance = No Stain
**Data were calculated from absorption measurements at 500 nm.

The heat stability of the modified lignin must be considered excellent on the basis of the very low filter residues obtained during standard testing. This observation is to some extent surprising since a large portion of the interactive or adsorptive functions inherent in the lignin, namely phenols, have been eliminated during the modification process.

Based on fiber staining experiments, lignin adsorption to the fibrous substrate still takes place but is considerably less bothersome in view of the lower lignin color.

The best heat stability, light reflectance, residual color and physical color were exhibited by the product of the invention process.

EXAMPLE 3

Sulfonated lignins (REAX 83) and lignosulfonate (MARASPERSE N22) modified by the invention process were compared to unmodified lignins, blocked lignins and a petroleum derived dyestuff dispersant (TAMOL Sn). The results are shown in Table II.

TABLE II
Color and Property Evaluation of Blocked and Oxidized Sulfonated Lignin and Lignosulfonates

| Starting Material | Modification (moles/1000 grams Sulfonated Lignin) | Heat Stability (Filter Residue in mg) | Fiber Staining (Light Reflectance in %)* | | Color Reduction Over Control in % | Azo Dye Color Retention Over Control in % | Viscosity at 50% Solids (pH 10) |
|---|---|---|---|---|---|---|---|
| | | | pH 4 | pH 7 | | | |
| Sulfonated Lignin | None | 447 | 59 | 81 | — | — | Too Thick |
| Sulfonated Lignin | 4 DES | 27 | 80 | 90 | 51 | 80 | Too Thick |
| Sulfonated Lignin | 4 DES + 1.3 ClO$_2$ (pH 11) | 5.4 | 93 | 97 | 93 | 99 | 700 Estimated |
| Sulfonated Lignin | 4 DES + 0.64 ClO$_2$ (pH 5) | 7.6 | 90 | 94 | 91 | 99 | — |
| Lignosulfonate | None | 12.9 | | | | | |
| Lignosulfonate | ClO$_2$ | would not disperse | — | — | — | — | — |
| Lignosulfonate | 3 DES + ClO$_2$ | 14 | — | — | — | — | — |
| Tamol Sn | — | 500 (did not filter) | 97 | 98 | — | 99 | |

*100% means no stain evident.

Reflectance values for the chlorine dioxide bleached lignin are very high at the highly exaggerated lignin loadings of 5 grams per 5 grams of the fiber. Generally, 400 mg of lignin per 5 grams of the fiber are used in commercial dye concentrations. At pH 7, a region in which the carboxyl groups should exist in their predominately ionized form, fiber staining is virtually non-existent. This is attributed to the absence of phenolic hydroxyl groups.

Azo dye reduction on dyestuff Blue 79, recognized as an extremely sensitive dye in that regard, is very low for the blocked and oxidized lignin. Here, also, testing was carried out using substantially higher lignin contents beyond those found during normal dyeing conditions. The absence of oxidizable groups, such as catechols and phenols, to which the azo reduction phenomena is attributed, is a plausible factor in explaining the excellent performance of this particular lignin derivative.

Viscosity of the low colored lignin depends very much on the degree of sulfonation. The lignin with the higher degree of sulfonation exhibits a more favorable solids to viscosity profile. In any event, product solubility, which is a direct function of viscosity, was enhanced during the bleaching step.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A method for decolorizing a lignin selected from the group consisting of lignosulfonate and sulfonated lignin surfactants derived from kraft and sulfite pulping processes comprising the steps of
    (a) blocking at least 80% of the lignin's phenolic functions with one or more blocking agents, and
    (b) oxidizing the blocked lignin with 0.1 to 5 moles chlorine dioxide per 1000 grams of lignin at a pH of 8–11.

2. The method of claim 1 wherein the lignin is in an aqueous solution of from 1% to 60% solids and the blocking agents are selected from the group consisting of ethylene oxide, propylene oxide, dimethylsulfate, diethylsulfate, and combinations thereof.

3. The method of claim 2 wherein the blocking agents are 1 to 10 moles propylene oxide per 1000 grams lignin and 0.1 to 10 moles diethylsulfate per 1000 grams lignin reacted successively, and the blocked lignin is oxidized with 1 to 2 moles chlorine dioxide per 1000 grams lignin at pH between 8 and 11 and the product of the oxidation step is spray dried.

4. The method of claim 3 wherein at least 90% of the phenolic functions are blocked with 5 moles propylene oxide per 1000 grams lignin at a temperature of from 25° C. to 100° C., 0.5 mole diethylsulfate per 1000 grams lignin at a temperature of about 25° C. and 1.4 moles chlorine dioxide per 1000 grams lignin at a temperature of about 25° C. were employed.

5. A method for decolorizing kraft lignin surfactants comprising the steps of
    (a) simultaneously sulfonating the lignin and blocking at least 80% of the phenolic functions in the lignin, with one or more suitable blocking agents, and
    (b) oxidizing the blocked, sulfonated lignin with 0.1 to 5 moles chlorine dioxide per 1000 grams of lignin at a pH of 5–13.

6. The method of claim 5 wherein the blocking agent is 3-chloro-2-hydroxypropane-1-sulfonate.

* * * * *

UNITED STATES PATENT AND TRADEMARK OFFICE
CERTIFICATE OF CORRECTION

PATENT NO. : 4,454,066  
DATED : June 12, 1984  
INVENTOR(S) : Peter Dilling and Peter T. Sarjeant It is certified that error appears in the above-identified patent and that said Letters Patent is hereby corrected as shown below:

In column 1, lines 60 through 68,

" COLORLESS

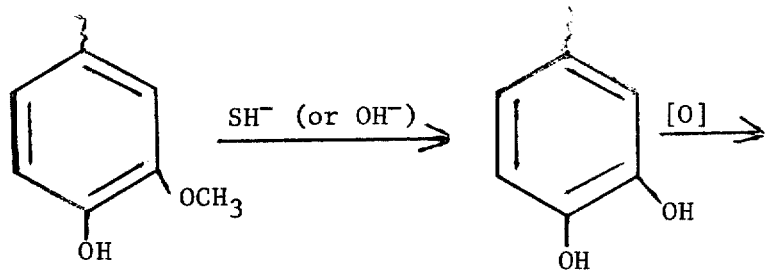

" should read

-- COLORLESS

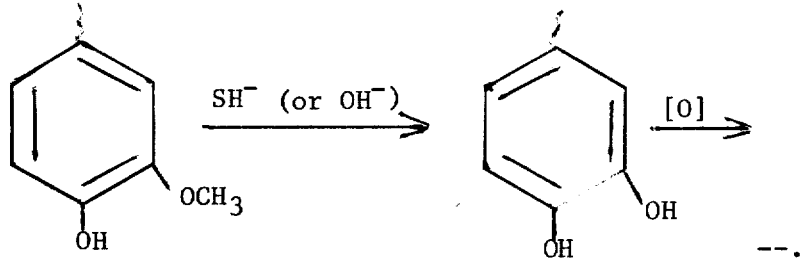

--.

UNITED STATES PATENT AND TRADEMARK OFFICE
CERTIFICATE OF CORRECTION

PATENT NO. : 4,454,066

DATED : June 12, 1984

INVENTOR(S) : Peter Dilling and Peter T. Sarjeant

It is certified that error appears in the above-identified patent and that said Letters Patent is hereby corrected as shown below:

In column 10, line 8, in claim 3, "at pH between 8 and 11" should read --at pH between 10 and 10.5--.

In column 10, line 24, in claim 5, "at a pH of 5-13." should read --at a pH of 8-11.--.

Signed and Sealed this

Tenth Day of September 1985

[SEAL]

Attest:

DONALD J. QUIGG

Attesting Officer  Acting Commissioner of Patents and Trademarks - Designate